United States Patent [19]
Holland

[11] Patent Number: 4,529,357
[45] Date of Patent: Jul. 16, 1985

[54] TURBINE BLADES

[75] Inventor: Maxwell J. Holland, Gloucestershire, England

[73] Assignee: Rolls-Royce Ltd, London, England

[21] Appl. No.: 561,147

[22] Filed: Dec. 14, 1983

Related U.S. Application Data

[63] Continuation of Ser. No. 158,304, Jun. 10, 1980, abandoned.

[30] Foreign Application Priority Data

Jun. 30, 1979 [GB] United Kingdom ............... 7922806

[51] Int. Cl.³ .............................................. F01D 5/18
[52] U.S. Cl. ................... 416/92; 416/96 R; 416/97 R
[58] Field of Search ............... 416/92, 97 R, 96 R, 416/96 A, 232; 415/114, 115, 116, 117

[56] References Cited

U.S. PATENT DOCUMENTS

| | | | |
|---|---|---|---|
| 2,696,364 | 12/1954 | Bartlett | 416/92 |
| 2,894,719 | 7/1959 | Foster | 416/92 |
| 2,966,331 | 12/1960 | Creek | 416/92 |
| 2,991,973 | 7/1961 | Cole et al. | 416/97 R |
| 3,044,745 | 7/1962 | Stark | 416/92 |
| 3,066,910 | 12/1962 | Bluck | 416/92 |
| 3,111,302 | 11/1963 | Bowmer | 416/232 |
| 3,314,650 | 4/1967 | McCormick . | |
| 3,420,502 | 1/1969 | Howald . | |
| 3,515,499 | 6/1970 | Beer et al. | 416/229 A X |
| 3,848,307 | 11/1974 | Kydd | 416/96 A X |
| 4,142,831 | 3/1979 | Dakin et al. | 416/97 R |

FOREIGN PATENT DOCUMENTS

| | | | |
|---|---|---|---|
| 204382 | 7/1956 | Australia | 416/92 |
| 1165132 | 10/1958 | France . | |
| 715421 | 12/1941 | Fed. Rep. of Germany | 416/97 R |
| 1476905 | 3/1970 | Fed. Rep. of Germany . | |
| 2345038 | 5/1974 | Fed. Rep. of Germany | 415/115 |
| 2434989 | 10/1975 | Fed. Rep. of Germany . | |
| 323718 | 8/1957 | Switzerland | 416/92 |
| 954063 | 4/1964 | United Kingdom . | |
| 1257041 | 12/1971 | United Kingdom | 416/92 |
| 1574166 | 9/1980 | United Kingdom . | |

Primary Examiner—Louis J. Casaregola
Assistant Examiner—Jeffrey A. Simenauer

[57] ABSTRACT

A hollow turbine blade 10 of aerofoil shaped cross section is provided with walls 18 of varying thicknesses to provide thermal slugging at those regions around the aerofoil profile where the blade experiences high thermal fluxes. The thicker regions of the blade 10 are provided with cooling channels 22 which are elongated in a direction extending from the external surface of the wall towards the internal surface of the wall. The thermal slugging slows down the rate of change of blade wall temperature to a value similar to the rates elsewhere in the blade section. The cooling channels 22 ensure that the temperature gradient across the wall 18 is low around the profile of the aerofoil.

6 Claims, 3 Drawing Figures

TURBINE BLADES

This application is a continuation of Ser. No. 158,304, filed June 10, 1980, now abandoned.

This invention relates to turbine blades.

In gas turbine engines there is a need to optimize cooling of the blades to ensure longer life while reducing the flow of coolant without loss of effective cooling. However, the blades have to withstand different temperature conditions at various stages in the operation of an engine. The blade cooling requirements of an engine running at a steady state are greatly different than during accelerations or deceleration of the engine. Furthermore, not only does the thermal environment change with changes of operation of the engine but also the heat transfer conditions around the profile of the blade can be greatly different from one region of the blade to another.

An object of this invention is to provide a hollow turbine blade for a gas turbine engine which will attain a substantially uniform temperature throughout its wall during operation of the engine.

According to the present invention there is provided a turbine blade of aerofoil shaped cross-section which in use is exposed to thermal fluxes which vary from one region of the blade to another region, the blade being hollow and having a wall of varying thickness, the wall being thicker at regions which in use are exposed to high fluxes than at those regions which in use are exposed to lower fluxes, the wall being provided with cooling channels located along the wall, at least the channels at the thicker regions of the wall being separate and elongated in a direction extending substantially perpendicular to the most nearly adjacent external surface of the wall towards the internal surface of the wall, and the elongated channels being provided with a lining which is thermally more conductive than the material from which the blade is made. Preferably only those channels at the regions exposed to fluxes above a predetermined value are elongated. Some of the elongated channels may be closed chambers which contain a heat transfer medium such as a metal (for example sodium) which is liquid at the operating temperature of the respective channels.

The invention will now be described, by way of an example, with reference to the accompanying drawings in which.

Figure 1:
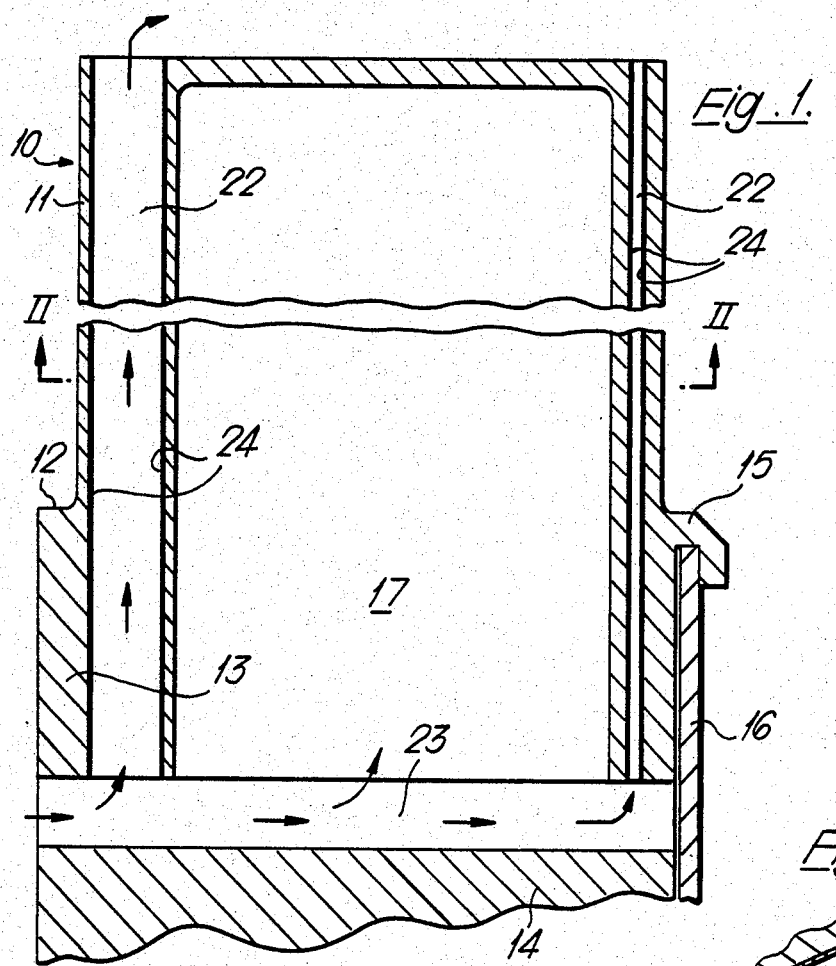
FIG. 1 is a longitudinal cross-sectional view of a turbine blade constructed according to the present invention sectioned along line I—I of FIG. 2.
Figure 3:
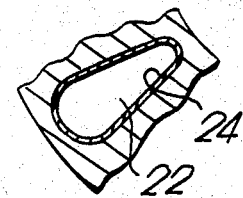
FIG. 3 shows in greater detail one of the coolant channels of the blade of FIG. 1.

Referring to the drawings there is shown a turbine blade 10 for an axial turbine of a gas turbine aero engine. The turbine blade 10 has an aerofoil shaped portion 11, a platform 12, and a root portion 13 for fixing the blade to the perimeter of a turbine disc 14. A hook 15 which locates in a rear mounted seal plate 16 prevents the blade from being moved out of the blade fixing slots in the rim of the disc.

The blade 10 is of hollow construction having a large central void 17 closed at the blade tip. The wall 18 of the aerofoil portion 11 of the blade is of varying thickness. The wall is thicker at the regions which in use are exposed to higher heat fluxes than the remainder of the profile of the blade, for example, the leading edge region 19 of the aerofoil and the region 20 of the trailing high pressure side 21 and the leading part of the high pressure side.

Cooling channels 22 are provided in the wall of the blade. These channels 22 extend in a direction along the length of the blade and are provided to convey cooling air from a cavity 23 formed between the bottom of the blade root and the base of the blade-fixing slot in the turbine disc. The cooling air issues from the tip of the turbine blade.

The cooling channels 22 at the thicker regions 19 and 20 are generally elongated in a direction extending from the external surface of the wall towards the internal surface of the wall. That is, as clearly shown in FIG. 2, cooling channels 22 are separate and elongated in a direction extending substantially perpendicular to the most nearly adjacent external surface of the wall towards the internal surface of the wall. Each of the channels 22 at the regions 19 and 20 is provided with a thermally conductive lining 24 such as copper or aluminum. The elongated channels serve to confine the heat flow across the walls to narrow paths between the channels whereas the thermally conductive lining 24 improves the heat transfer from the external surface of the blade and from the narrow walls between the channels compared to that through the blade material.

The thickness of the wall is varied in order to vary the thermal response of the wall. That is to say, during transient operating conditions, for example, accelerations and decelerations of the engine, the thicker regions of the blade act as thermal slugging masses slowing down the rate of change of blade wall temperature to a value similar to the rates elsewhere in the blade section. This ensures that during transient conditions the temperature remains substantially uniform around the profile of the aerofoil. The actual thicknesses of the profile at any given location on the profile will be dictated by experimental and development calculations, and the final design thickness will be the optimum comensurate with ease of manufacture. At the trailing edge region of the aerofoil section the wall thickness defined by the aerofoil shape is too thin for there to be an effective thermal slugging.

The thermally conductive lining 24 in the channels 22 ensure that during steady-state and transient running of the engine the heat transfer across the wall is such that the temperature gradient across the wall is low at all regions around the profile of the aerofoil. The size, number, spacing and shape of the cooling channels are chosen to control the temperature level and gradient across the wall of the blade to within predetermined limits.

Cooling passages may also be provided to conduct coolant from the central void 17 through the wall of the blade to issue from holes in the external surface of the blade to provide film cooling. These holes may be provided in the leading edge region 19, or trailing edge of the blade.

In an alternative design of blade constructed in accordance with the present invention, the cooling channels 22 may be closed-off at the tip of the blade 10 and passages provided to interconnect the cooling channels 22 to the central void 17.

Figure 2:
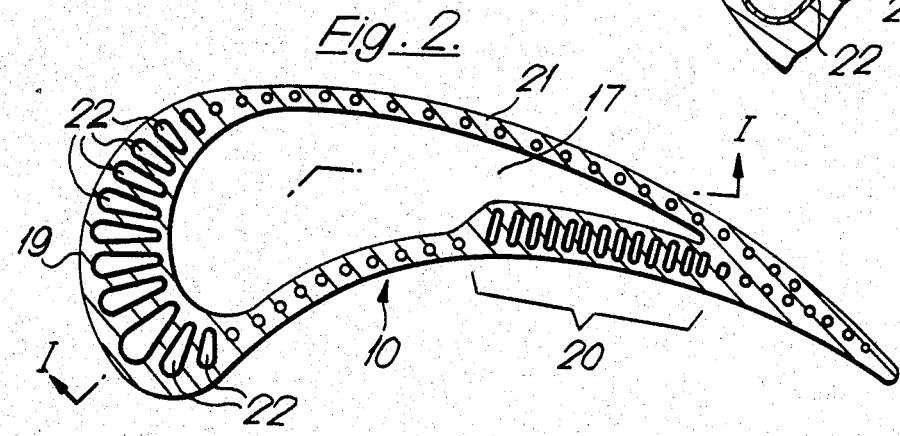
FIG. 2 is a cross-sectional view of the blade of FIG. 1 sectioned along line II—II of FIG. 1.

In a further design of blade constructed according to the present invention some of the cooling channels of the blade of FIGS. 1 and 2 may be blanked-off at each end to define closed chambers. For example, alternate channels 22 could be so closed-off. In this case the closed-off channels 22 are filled with a heat exchange medium, such as for example, sodium, which becomes liquid during use of the blade, or other suitable heat exchange fluids or fillers which have a better thermal conductivity than the material from which the blade is made.

In yet a further design of blade, the cooling channels 22 may extend in directions transverse to the length of the blade instead of along the length of the blade. For example, the cooling channels may extend from the leading edge towards the trailing edge.

The invention is applicable to all types of turbine blades whether or not they also have a shroud at the tip or have snubbers.

I claim:

1. A turbine blade of aerofoil shaped cross-section which in use is exposed to thermal fluxes the level of which varies from one region of the blade to another region, the blade having a large central void enclosed by the internal surface of a wall of varying thickness, the wall being thicker at regions which in use are exposed to high fluxes than at those regions which in use are exposed to lower fluxes, the wall being provided with cooling channels located along the wall of the blade, at least the channels at the thicker regions of the wall being separate and elongated in a direction extending substantially perpendicular to the most nearly adjacent external surface of the wall towards said internal surface of the wall, and the elongated channels being provided with a lining which is thermally more conductive than the material from which the blade is made.

2. A turbine blade according to claim 1 wherein only those channels at the thicker regions of the wall are elongated.

3. A turbine blade according to claim 1 wherein the channels are adapted for coolant flow therethrough, said channels communicate with the central void of the blade and cooling passages are provided to conduct the coolant from the void to holes in the external surface of the blade.

4. A turbine blade according to claim 1 wherein said blade has a leading edge region, and said thicker wall regions are provided at the leading edge region of the aerofoil.

5. A turbine blade according to claim 1 wherein said blade has a root end and a tip; said cooling channels are adapted to have a cooling fluid flow therethrough, and said cooling channels extend from a cavity at the root end of the blade and are open at the tip of the blade.

6. A turbine blade according to claim 1 wherein the blade has a high pressure side, said high pressure side has a trailing part, and said thicker wall regions are provided at the trailing part of said high pressure side.

* * * * *